Patented Feb. 12, 1946

2,394,912

UNITED STATES PATENT OFFICE 2,394,912

HALOGEN SUBSTITUTED ACETONITRILES

Ingenuin Hechenbleikner, Stamford, Conn., assignor to American Cyanamid Company, New York, N. Y., a corporation of Maine No Drawing. Application January 20, 1943, Serial No. 472,996

4 Claims. (Cl. 260—464)

The present invention relates to halogen substituted acetonitriles and more particularly to new chlorobromoacetonitriles characterized by the general formula:

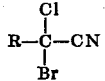

in which R is chosen from the group consisting of hydrogen, chlorine and bromine.

These new halogen substituted acetonitriles, namely monochloromonobromoacetonitrile, monochlorodibromoacetonitrile and dichloromonobromoacetonitrile may be prepared according to the methods set out in the following examples in which the parts are by weight.

EXAMPLE 1

Monochloromonobromoacetonitrile 160 parts of bromine were added slowly to a mixture of 75 parts of monochloroacetonitrile, 84 parts of sodium bicarbonate and 1 part of water heated on a steam bath. After heating for about two hours, the reaction mixture was cooled to room temperature and washed with one liter of water. The product was separated from the aqueous layer, dried and distilled. The monochloromonobromoacetonitrile was obtained as a colorless liquid boiling at 125–130° C. at 760 mm. and having a density of 1.68 at 25° C.

EXAMPLE 2

Dichloromonobromoacetonitrile 80 parts of bromine were added slowly to a mixture of 54 parts of dichloroacetonitrile, 25 parts of calcium carbonate and 160 parts of carbon tetrachloride in a 3-neck flask fitted with a stirrer and a reflux condenser. The mixture was stirred and kept at reflux temperature on a steam bath for about 3 hours. The reaction vessel was irradiated with an ultra-violet lamp to start the reaction. The reaction mixture was then cooled, washed with water, washed with dilute aqueous sodium hydrosulfite solution and fractionated under reduced pressure. The dichloromonobromoacetonitrile was obtained as a colorless liquid having a boiling point of 55° C. at 100 mm. pressure, and a density of 1.836 at 25° C.

EXAMPLE 3

Monochlorodibromoacetonitrile 45 parts of monochlorodibromoacetamide and 90 parts of phosphorus pentoxide were placed in a distilling flask. After thoroughly mixing the reagents, the flask was heated to 180° C. under 24 mm. pressure. The product which distilled off was redistilled under reduced pressure. The monochlorodibromoacetonitrile was obtained as an orange-colored liquid having a boiling point of 50° C. at 24 mm. pressure, and a density of 2.204 at 25° C.

The compounds of this invention are adapted for various uses, more particularly as intermediates and insecticides. They are especially useful as fumigants for the control of grain-infesting insects.

While the invention has been described with particular reference to specific embodiments it is to be understood that it is not to be limited thereto but is to be construed broadly and restricted solely by the scope of the appended claims.

I claim:

1. Halogen substituted acetonitriles of the formula

in which R is chosen from the group consisting of hydrogen, chlorine and bromine.
2. Monochloromonobromoacetonitrile.
3. Monochlorodibromoacetonitrile.
4. Dichloromonobromoacetonitrile.

INGENUIN HECHENBLEIKNER.